United States Patent [19]

Santamäki et al.

[11] Patent Number: 4,717,957
[45] Date of Patent: Jan. 5, 1988

[54] VIDEO COMPRESSION METHOD

[75] Inventors: Harry Santamäki, Espoo; Juha Leppänen, Helsinki; Pontti Haikonen; Ilkka Korhonen, both of Espoo, all of Finland

[73] Assignee: Valtion teknillinen tutkimuskeskus, Finland

[21] Appl. No.: 899,291

[22] PCT Filed: Dec. 5, 1985

[86] PCT No.: PCT/FI85/00097
§ 371 Date: Aug. 13, 1986
§ 102(e) Date: Aug. 13, 1986

[87] PCT Pub. No.: WO86/03922
PCT Pub. Date: Jul. 3, 1986

[30] Foreign Application Priority Data

Dec. 14, 1984 [FI] Finland ................ 844970

[51] Int. Cl.⁴ .................................... H04N 7/13
[52] U.S. Cl. ........................... 358/136; 358/105
[58] Field of Search ........... 358/133, 135, 136, 138, 358/105

[56] References Cited
U.S. PATENT DOCUMENTS

| 3,956,580 | 5/1976 | Murayama | 358/260 |
| 4,307,420 | 12/1981 | Ninomiya | 358/136 |
| 4,410,916 | 10/1983 | Pratt | 358/263 |
| 4,591,907 | 5/1986 | Catrus | 358/136 |

Primary Examiner—Howard W. Britton
Attorney, Agent, or Firm—McGlew and Tuttle

[57] ABSTRACT

The invention relates to a video compression method to be employed in connection with the conditional replenishment transmission and receiving method. In the transmitter there are detected such areas of the image that are changed with respect to the previous image, and the picture information representing the occurred changes, along with the addresses of the respective picture areas, is sent into the transmission channel. In the receiver there is reconstructed the new image on the basis of the previous image and the picture information representing the occurred changes. According to the invention, both in the transmitter and the receiver there is employed at least one reference memory (6; 14) whereinto a reference image of the transmitted picture information is stored and which reference memory is used so that whenever the transmitter recognizes a picture area to have changed, it is checked whether the changed picture information corresponds to the information stored in the respective location in the reference memory; if the answer is positive, the transmitter sends a code word informing te receiver that the required picture information must be picked from the reference memory; if the answer is negative, the picture information representing the changes occurred in the picture area is transmitted.

14 Claims, 2 Drawing Figures

VIDEO COMPRESSION METHOD

FIELD AND BACKGROUND OF THE INVENTION

The present invention relates to a video compression method which is employed in connection with the conditional replenishment transmission and receiving method. In the transmitter used in the method, those areas which are changed with respect to the previous image are detected and the respective picture information, together with the addresses of the respective areas, is transmitted into the transmission channel. In the receiver a new image is reconstructed on the basis of the previous image and the addresses of the changed picture areas as well as on the basis of the picture information representing the occurred changes.

A digitized video signal which contains the picture information and is transmitted by means of the pulse code modulation method, requires a transmission channel capacity, the magnitude whereof is defined on the basis of the amount of picture elements and grey scale levels as well as the number of images to be transmitted per second. The information to be transmitted can be decreased without deteriorating the quality of the image by transmitting only the video signal representing the change occurred in between successive images. Therefore it is necessary, in one way or another, to detect the areas in the image which are changed with respect to the previous image, and only these changed areas are then transmitted. The information concerning these transmitted changed picture areas must also be provided with addresses which denote the picture area in question. Thus it is possible to reconstruct every image in a true and accurate fashion.

In the transmitter applying the above explained method, two separate picture memories are needed, the first containing the new image and the second containing an image corresponding to that which was last reconstructed by the receiver. In the receiver, only one picture memory is needed, which is the display memory.

SUMMARY OF THE INVENTION

The object of the present invention is to improve the aforementioned video compression method so that the amount of transmitted information is further decreased.

The method of the invention is characterized in that in connection with the above described prior art method, the conditional replenishment method, there is employed a reference memory both in the transmitter and the receiver. A so-called reference image made according to the transmitted picture information is stored in this reference memory, and the reference memory is used so that whenever a picture area is detected to have changed in the transmitter, a check is made to see whether this changed picture information corresponds to the information located in the respective place in the reference memory. If the answer is positive, a code word is sent to inform the receiver that the necessary picture information must be picked from the respective location in the reference memory. If the answer is negative, the picture information representing the change that has occurred in the picture area is transmitted.

In the transmitter of the apparatus applying the method of the present invention, there are, in addition to the two previously mentioned picture memories, other additional picture memories, i.e. a so-called reference memories—in the simplest case, however, only one. The reference memories are also provided in the receiver.

The method of the invention is designed to be employed in particular, but not exclusively, in connection with the above described prior art method in such cases where the transmitted video signal is created while the camera does not move but remains stably on the same spot. Thus a solid background is seen in the image, and the changes are created while the objects move in front of the background. Consequently, the proceeding front edge of the moving object keeps covering the background, and respectively the back edge of the object keeps revealing the same background. The conditional replenishment method, which was described in the beginning of this specification, recognizes as changed areas both the moving object as such, and the background which is revealed from behind the moving object.

BRIEF DESCRIPTION OF DRAWINGS

In the following the invention is explained with reference to the appended drawing, where.

DESCRIPTION OF THE PREFERRED EMBODIMENT

Figure 1:
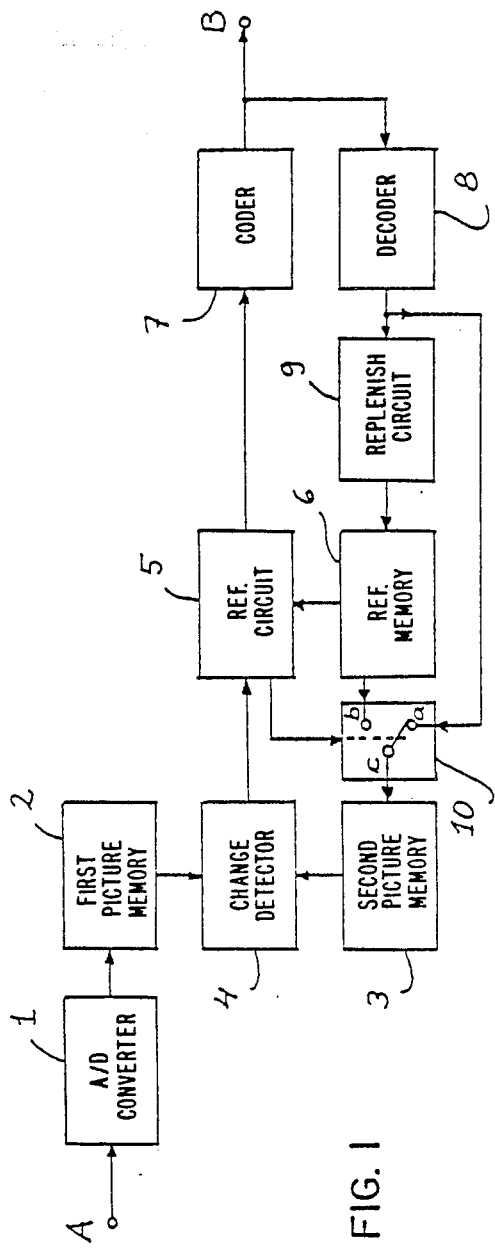
FIG. 1 is a block diagram of a transmitter used for the method of the invention.

In the transmitter of FIG. 1, the input interface A is connected to an analogue-to-digital (A-to-D) converter 1, which again is connected to a first picture memory 2. The first and a second picture memory 2 and 3 are connected to a detector 4 of changed picture areas, which is connected to a reference circuit 5, where also a reference picture memory 6 is connected. The reference circuit 5 is connected to a coder 7, which is followed by an output interface B. The output of the coder 7 is also connected to a decoder 8 and further both to a replenishment circuit 9 of a reference picture memory 6 and to the reference picture memory 6 as well as to a switch 10, which is advantageously an electronic switch. The first input a of the switch 10 is connected to the output of the decoder 8, the second input b is connected to the reference memory 6, and the output c is connected to the second picture memory 4. The switch 10, whereby either of the inputs a, b is connected to the output c, is controlled by the reference circuit 5.

A standard TV video signal is transferred, for instance from a video camera, through the input interface A to the A-to-D converter 1, where the video signal is digitized, and simultaneuously it is transferred into the timing and control circuit (not represented in the drawing), where the timing and control signals required in the transmitter are formed. The digitized video signal is stored in the first picture memory 2, and further provided to the detector 4 of the changed picture areas, into which detector there is also supplied the previously transmitted picture information or corresponding informations from the second picture memory 3.

A digitized TV image is composed of n lines, each of which lines is divided into m elements, i.e. the image is a raster formed by n×m picture elements (n and m are integrals). The picture area in turn consists of a block containing a chosen number of picture elements. The digitized video signal is formed of the address of the block and of the information concerning this block (for instance grey scale levels).

When a certain picture area is detected as changed in the detector 4, the reference circuit 5 checks whether the changed picture information corresponds to the information located in the respective location in the reference memory 6. This is the case for example when the camera is stationary and the information of a stable background is stored into the reference memory 6, and the changed picture area in question is a background area which has been revealed from behind a moving object. Now, instead of picture information, a code word is sent via the output interface B to the transmission channel. The code word is formed of the address of the picture area and of the code word proper, which may be very short. The code word informs the receiver that the required picture information must be picked from the corresponding reference memory. The content of the second picture memory 3 must be modified in similar fashion. Under control of the reference circuit 5, the second input b of the switch 10 is connected to its output c, and the corresponding picture information is read from the reference picture memory 6 into the second picture memory 3.

The situation is different when the detector 4 recognizes that a certain picture area has changed but a check by the reference circuit 5 shows that the picture information is different from the information stored in the corresponding location in the reference memory 6. Now the picture information representing the change in the picture area is sent in a currently known fashion from the transmitter through the coder 7 and the output interface B into the transmission channel. The content of the second picture memory 3 is modified so as to correspond to the transmitted picture information. Under control of the reference circuit 5, the first input a of the switch 10 is connected to its output c, and the transmitted picture information is read into the second picture memory 3 through the decoder 8.

Figure 2:
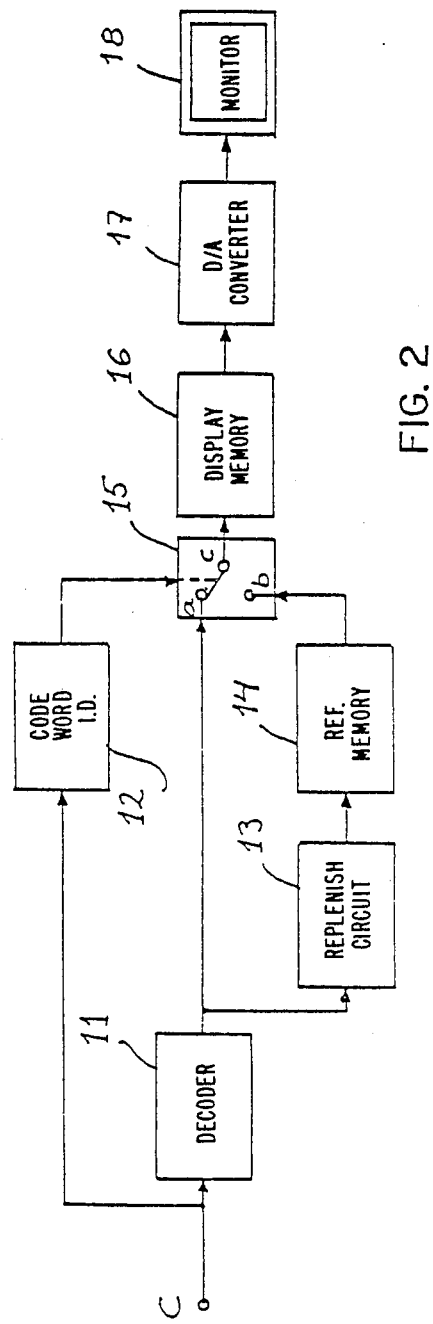
FIG. 2 illustrates a corresponding receiver.

In an receiver according to FIG. 2, the input interface C is connected to a decoder 11 and to a code word identifier 12. The decoder 11 is connected to a replenishment circuit 13 and further to a reference picture memory 14. The first input a of the switch 15 is connected to the output of the decoder 11, and the second input b to the output of the reference picture memory 14. The output c of the switch 15 is connected to a display memory 16. The switch 15, which connects either of the inputs a, b to the output c, is controlled by the code word identifier 12. The display memory 16 is connected to a monitor 18 via a digital-to-analogue (D-to-A) converter 17.

When the transmitter sends a code word, instead of picture information, to the transmission channel, and the said code word is received by the receiver, the code word is then identified by means of the code word identifier 12, which connects the reference picture memory 14 to the display memory 16 via the switch 15. Now the required picture information is picked at the corresponding location in the reference memory 14 and is placed in the corresponding location in the display memory 16. The address of the picture area, indicated by the code word, is read into the reference memory 14 for instance via the decoder 11 and the replenishment circuit 13 of the reference memory. Thus the amount of transmitted information can be decreased, because the code word can be much shorter than the picture information it replaces.

If the transmitter sends the picture information representing the change in the picture area, it is normally received in the receiver, decoded and stored into the display memory 16. Now the switch 15 is in a position where it connects the decoder 11 to the display memory 16. From the display memory 16, the picture information is fed, via the D-to-A converter 17, to be seen on the screen of the monitor 18.

The reference image of the transmitted picture information is stored in the reference memory 6 by means of the replenishment circuit 9 of the reference memory. The storage of the reference image is advantageously carried out so that the new image is integrated into the reference memory at a long time constant. This can be illustrated as the formula 1 as follows:

$$P_{ijr} = k \cdot P_{ij(r-1)} + (1-k) \cdot P_{ij} \tag{1}$$

where $P_{ij}$ = the new picture information connected to the picture area ij;

$P_{ijr}$ = the new picture information connected to a certain picture area ij, which information replaces the old information $P_{ij(r-1)}$ stored in the reference memory;

$P_{ij(r-1)}$ = the picture information connected to the corresponding picture area ij, which information is store in the reference memory;

k = constant; $0 < k < 1$ i, j = integrals when $k \sim 1$, the time constant is long. In that case the picture information stored in the reference memory changes very slowly, and is unaffected by rapid changes in the camera image or parts thereof.

Both in the transmitter and the receiver, several reference memories can be employed, the content whereof is stored from the transmitted picture information in various different ways—it can be for instance integrated at time constants with different lengths (the magnitude of k varies in the formula 1). If only one reference memory is employed, the content stored therein can be the image seen by the camera either at the moment when the camera is switched on, or at any moment ordered by the cameraman. If several reference memories are available, the content stored therein can be the received image or an image corresponding to the received image at certain time intervals. The said information is written into the reference memory by means of the reference memory replenishment circuit.

We claim:

1. A device for the compressive transmission of a video signal having plural pictures with picture areas that change with respect to a previous picture, and picture areas that form a reference image that is the same for more than one picture, comprising:

a transmitter for receiving the video signal, said transmitter having a first picture memory for storing each picture in sequence, a change detector connected to said first picture memory for detecting any changes in the picture with respect to a previous picture, a second picture memory for storing a previous picture to that stored in said first picture memory, a reference circuit connected to said change detector for receiving signals corresponding to changes in the picture areas, a reference memory for storing the reference image, said reference memory being connected to said reference circuit and being connectable to said second picture memory for applying said reference image to be stored in said second picture memory, a replenishment circuit connected between an output of said reference circuit and an input of said reference memory for applying a replenished image as a new reference image to said reference memory, and a switch having two inputs and one output, one of said inputs being connected to said reference memory and one of said inputs being connected to the output of said reference circuit, the output said switch being connected to said second picture memory, said reference circuit being connected to said switch for switching said output of said switch between its two inputs based on whether said change detector has detected a change in a picture area which is different from or which corresponds to picture areas of said reference image, said reference circuit including means for producing a code word when said change detector detects changes that correspond to picture areas of said reference image, said code word corresponding to locations of said picture areas of said reference image, said reference circuit transmitting said code word when the changes correspond to picture areas of said reference image and transmitting the detected changes when the changes do not correspond to picture areas of said reference image;

and a receiver for receiving the changes and the code words from said reference circuit, said receiver including a code word identification circuit for identifying the code word, a further switch connected to further identification circuit and having a first input connected to said reference memory and a second input connected to receive the detected changes transmitted by said reference circuit, said further switch having a output, and a display memory connected to said output for storing signals to be used in reproducing the pictures transmitting by said transmitter, said further switch being switched to said further reference memory by said identification circuit when said identification circuit identifies a code word for applying picture areas of said reference image to said display memory, and being switched to receive said detected changes when said identification circuit does not detect a code word.

2. A device according to claim 1 including an analogue-to-digital converter connected to said first picture memory for producing a digital video signal corresponding to the video signal having a plurality of pictures, a digital-to-analogue converter connected to said display memory for converting signals in said display memory which are digital to analogue signals for reproducing pictures at said receiver.

3. A device according to claim 2 including a coder connected to the output of said reference circuit, said coder having an output for transmitting signals from said reference circuit to said receiver, a decoder connected between an output of said coder and an input of said replenishment circuit, said decoder having an output connected to one of the inputs of said first mentioned switch, said receiver having a further decoder having an input for receiving signals from said coder, and an output connected to one input of said further switch, and a further replenishment circuit connected between the output of said further decoder and an input of said reference memory for storing new reference images in said reference memory.

4. A compression method for transmitting video signals having plural pictures with picture areas that change with respect to a previous picture, and picture areas that form a reference image that is the same for more than one picture, comprising:
storing the reference image in a transmitter and in a receiver;
detecting changes in the picture areas of the picture compared with the picture areas of a previous picture at the transmitter;
comparing the detected changes to the reference image at the transmitter;
if the changes correspond to picture areas of the reference image, forming a code word that is instructive on which picture areas correspond to the detected changes;
sending the code word to the receiver;
using the code word to pick corresponding picture areas from the reference image at the receiver to reconstruct the corresponding picture areas at the receiver;
and if the detected changes do not correspond to picture areas of the reference image at the transmitter, transmitting the detected changes to the receiver;
receiving the detected changes and using the detected changes to reconstruct the picture areas at the receiver.

5. A method according to claim 4 including storing new references images in the transmitter and receiver while observing a long time constant with respect to changes in picture areas of the pictures which do not correspond to picture areas of the reference images.

6. A method according to claim 4 including storing a plurality of reference images at the transmitter and at the receiver.

7. A method according to claim 4 including using a camera to produce the video signal, the reference image corresponding to an image viewed by the camera when the camera is first activated.

8. A method according to claim 4 including using a camera to generate the video signal and selecting an image to be viewed by the camera for producing the reference image.

9. A method according to claim 4 including transmitting the reference image of the transmitter to the receiver for storing the reference image at the receiver and transmitting a new reference image from the transmitter for storing a new reference image at the receiver at a selected time interval.

10. A video compression method for use with a conditional replenishment transmission and receiving method, in a transmitter of which method picture areas changed with respect to previous images are detected, and picture information representing occurred changes, along with addresses of the respective areas, is sent to a transmission channel, and in a receiver a new image is reconstructed on the basis of the previous image, addresses of changed picture areas and on the basis of information representing the occurred changes the method comprising:
employing at least one reference memory in the transmitter and in the receiver;
storing a reference image of the transmitted picture information in the reference memory;
recognizing, at the transmitter, whenever a picture area has changed;

checking, whenever a picture area has changed, so as to determine whether the changed picture information corresponds to the information stored in the respective location in the reference memory;

sending a code word, informing the receiver that the required picture information must be picked from the reference memory, if the changed picture information corresponds to information stored in the respective location in the reference memory;

and, transmitting the new picture information representing the change occurred in the picture area if the changed picture information does not correspond to the information stored in the respective location in the reference memory.

11. The method according to claim 10, wherein:
the new reference image is integrated at a long time constant from the transmitted picture information into the reference memory.

12. The method according to claim 10, wherein:
both the transmitter and the receiver use several reference memories, the content being stored on the basis of the transmitted picture information in various different ways, such as by integrating at time constants with different lengths.

13. The method according to claim 10, wherein:
the chosen content of the reference memory is the image seen by the camera either at the time when the camera is switched on or at any subsequent selected time.

14. The method according to claim 13, wherein:
the chosen content of the reference memory is the received image, or an image corresponding to the received image at certain time intervals.

* * * * *